United States Patent [19]

Gonnet et al.

[11] Patent Number: 4,840,985
[45] Date of Patent: Jun. 20, 1989

[54] GRINDING AGENT BASED AND/OR COPOLYMERS FOR AQUEOUS SUSPENSION OF COARSE MINERAL MATERIALS FOR PIGMENT APPLICATIONS

[75] Inventors: Olivier Gonnet, St. Andréde Corcy; Georges Ravet, Craponne; Jacky Rousset, Chatillon sur Chalaronne, all of France

[73] Assignee: Coatex, S. A., Caluire, France

[21] Appl. No.: 102,775

[22] Filed: Sep. 23, 1987

Related U.S. Application Data

[63] Continuation of Ser. No. 881,490, Jul. 1, 1986, abandoned, which is a continuation of Ser. No. 731,752, May 7, 1985, abandoned, which is a continuation of Ser. No. 518,635, Jul. 29, 1983, abandoned.

[30] Foreign Application Priority Data

Aug. 6, 1982 [FR] France ............... 82 14030

[51] Int. Cl.$^4$ ............... C08J 3/12
[52] U.S. Cl. ............... 524/425; 524/427; 524/413; 106/465
[58] Field of Search ............... 106/308 M, 465; 523/333; 524/425, 556; 526/240; 525/330.2

[56] References Cited

U.S. PATENT DOCUMENTS

| | | | |
|---|---|---|---|
| 2,552,775 | 5/1951 | Fischer et al. | 526/240 |
| 3,705,137 | 12/1972 | Kuwahara et al. | 526/240 |
| 3,764,530 | 10/1973 | Burland et al. | 526/240 |
| 3,950,200 | 4/1976 | Eldib | 525/330.2 |
| 4,089,699 | 5/1978 | Blackburn et al. | 106/308 M |
| 4,478,968 | 10/1984 | Jaffe | 106/308 M |
| 4,509,987 | 4/1985 | Farrar et al. | 106/308 M |
| 4,554,307 | 11/1985 | Farrer et al. | 524/556 |

FOREIGN PATENT DOCUMENTS

| | | | |
|---|---|---|---|
| 495250 | 8/1953 | Canada | 524/556 |
| 973568 | 10/1964 | United Kingdom | 524/556 |
| 1375731 | 11/1964 | United Kingdom | 524/556 |
| 2058801 | 4/1981 | United Kingdom | 524/832 |

*Primary Examiner*—C. Warren Ivy
*Assistant Examiner*—Alex H. Walker
*Attorney, Agent, or Firm*—Oblon, Spivak, McClelland, Maier & Neustadt

[57] ABSTRACT

Grinding agent based upon acrylic polymers and/or copolymers for aqueous suspension of coarse mineral materials for applications in pigments.

Grinding agent for aqueous suspensions of mineral materials intended for application in pigments, consisting of an acid acrylic polymer and/or copolymer which is partially neutralized by at least one neutralizing agent having at least one monovalent function.

The grinding agent according to the invention is applicable more particularly to the preparation by grinding of mineral materials such as calcium carbonate, dolomites, calcium sulphate, kaolin, titanium dioxide, intended for pigmentary applications as varied as paper coating, pigmentation of paints, fillers of rubbers or synthetic resins or matting synthetic textiles.

15 Claims, No Drawings

GRINDING AGENT BASED AND/OR COPOLYMERS FOR AQUEOUS SUSPENSION OF COARSE MINERAL MATERIALS FOR PIGMENT APPLICATIONS

This application is a continuation of application Ser. No. 881,490, filed July 1, 1986, now abandoned, which is a continuation of application Ser. No. 731,752, filed May 7, 1985, now abandoned, which is a continuation of application Ser. No. 518,635, filed July 29, 1983, now abandoned.

The invention concerns an improved grinding agent in an aqueous suspension of coarse mineral materials, consisting of partially acid acrylic polymers and/or copolymers, making it possible to obtain an aqueous suspension of refined mineral particles, intended in particular for applications in pigments of size less than 2 microns and of which at least 75% have one dimension less than 1 micron.

The invention also concerns the new application of the the grinding agent in an improved process for preparing by grinding an aqueous suspension of mineral materials the viscosity of which remains constant with time, thus ensuring considerable ease of handling and application, the process being particularly suitable for grinding an aqueous suspension of calcium carbonate of which the content of dried matter is at least 70% by weight, of which at least 95% of the constituent particles after grinding are smaller than 2 microns, and 75% of them smaller than one micron.

The use of mineral substances such as calcium carbonate, sulphate and silicate, and titanium dioxide for preparing industrial products for the paint industry, for coating paper, filler for rubbers and synthetic resins etc. has been known for a considerable time.

However since these mineral substances do not have a natural lamellar or laminated structure which would facilitate dispersion, as is the case for certain substances such as the aluminium silicates usually known as kaolin, the specialist must convert them by grinding into a very fine aqueous suspension in which the constituent particles are as small as possible, i.e. smaller than a few microns, if they are to be used in the pigments.

The number of publications in the literature shows the extent and complexity of grinding mineral substances in an aqueous medium in order to obtain the refined grade necessary for application in the paint industry. Thus in the particular case of paper finishing, it is well known that the coating formed from mineral pigments such as the kaolins, calcium carbonate, calcium sulphate and titanium dioxide suspended in water, also contains binding agents and dispersants together with other additives such as thickeners and colouring agents. It is desirable for a coating of this kind to have a low viscosity which remains stable throughout the coating process in order to facilitate handling and application, as well as the highest possible content of organic matter in order to reduce the amount of heat necessary to dry out the aqueous fraction of the coating material. An ideal suspension of this kind, combining all these basic qualities, would resolve the specialist's well known problems of grinding, storage, transport from the production plant to the place of application and finally transfer by pump during use.

In this connection it has been found that the techniques of grinding mineral substances in an aqueous medium led to suspensions that were unstable with time, as the mineral substances settled and the viscosity increased. For this reason the specialist in processes belonging to the oldest techniques of producing mineral materials by grinding, has become resigned to grinding the mineral substance in an aqueous suspension in one or more successive operations, then drying and sorting this ground product by removing the particles that are too big, and separating the mineral particles of the desired grain size in order to obtain a fine mineral powder with a low water content. This fine powder for applications in pigments is easily transportable from the production plant to the place of application where it is again placed in suspension in water for use as a pigment.

The inability to conserve the mineral pigment in the form of an aqueous suspension between the operations of grinding and application has encouraged the specialists to continue to search for a method which involves grinding mineral substances in an aqueous suspension, producing after grinding a pigment suspension with low viscosity that is stable with time. Thus for example French Pat. No. 1 506 724 proposes a process for preparing by grinding an aqueous suspension of calcium carbonate, stable with time, which consists of forming under stirring an aqueous suspension containing 25–50% by weight of calcium carbonate and grinding this aqueous material using an appropriate grinding material, in the presence of a dispersant. This dispersant is a water-soluble acrylic polymer, which is added to the grinding medium at the rate of 0.2 to 0.4% by weight of the calcium carbonate present. Now, despite the undoubted advantage of having a pigmentary mineral suspension that is stable with time, it appears that such a suspension has disadvantages that the specialist may consider to be substantial. Such is the case for example for the dry matter content of such a suspension to be ground, which must necessarily be between 25% and 50% by weight and preferably equal to about 40% by weight. If this concentration is less than 25%, the process described is economically unattractive owing to its low yield, and if the initial dry matter content is above 50%, the efficiency of the grinding process falls owing to the sharp rise in the viscosity of the medium which becomes an obstacle to the grinding process itself and leads to a suspension with large grain size.

Thus when the dry matter concentration of the suspension to be ground is between 25% and 50% by weight, the grain size of the calcium carbonate obtained after a very long period of grinding, in the presence of the dispersant, can be considered as suitable for pigments, since 95% of the particles have a greatest dimension less than 2 microns.

This inability to grind an aqueous suspension of mineral substances with a concentration above 50% owing to the sharp increase in viscosity has encouraged researchers to find another approach. Processes have been proposed for forming an aqueous suspension of mineral substances with a high dry matter content, without grinding. For example French Pat. No. 1 562 326 describes a process for preparing an aqueous suspension of mineral substances. The objective of this process is to obtain an aqueous suspension which is highly concentrated in dry matter and sufficiently stable to be transported in this form from the production plant to the place of use. The proposed process consists of forming an aqueous suspension of mineral matter containing from 70 to 85% by weight of dry matter of which at least 99% by weight of the initial particles have one dimension less than or equal to 50 microns, then stirring the said suspension in the presence of a dispersing agent which may be a sodium or potassium salt, a polyphosphoric acid, a polyacrylic acid, a polysilicic acid, etc. obtained by their complete neutralisation using sodium or potassium hydroxide. The dispersant is then introduced at a concentration of about 0.05% to 0.5% by weight of the dry matter in the said suspension. The author notes that the dry matter content of the suspension should not be greater than 85% by weight owing to the sharp increase in its viscosity and could not be less than 70% by weight without leading to harmful sedimentation.

Thus the proposed solutions are not fully satisfactory.

One of these solutions concerns grinding, in the presence of a dispersant, an aqueous suspension of calcium carbonate containing too little dry matter to be interesting, although it does have the advantage of producing a pigmentary suspension of low viscosity and small grain size, giving up to 95% of particles smaller than 2 microns.

The other of these solutions concerns the preparation of an aqueous suspension with a high dry matter content, containing 70% to 85% by weight of mineral materials of which 99% of the initial particles have one dimension less than or equal to 50 microns, by introducing into the medium a dispersant to stabilise these particles. However this process, although providing a suspension of low viscosity, is not usable because the grain size of the constituent mineral particles is too irregular and coarse for applications in pigments.

Since the processes recommended in the literature did not meet the requirements of a pigmentary aqueous suspension which is simultaneously concentrated in dry matter, with small grain size and with low, stable viscosity, the applicant on the basis of considerable research has already proposed, in French Pat. No. 2 488 814 a new grinding agent for mineral substances in an aqueous medium, capable of providing a pigmentary suspension having the desired qualities. This grinding agent, made up of acrylic, alkaline polymers and/or copolymers, consists only of the fraction of these acrylic alkaline polymers and/or copolymers of which the specific viscosity lies between 0.3 and 0.8.

In the prior art, the use of acrylic alkaline polymers and/or copolymers was well known as a dispersant for mineral substances in an aqueous suspension, but not as a grinding agent. For this purpose the acrylic alkaline polymers and/or copolymers are prepared according to known processes, by radical polymerization of the acrylic acid in the presence of polymerization regulators such as, for example, organic compounds based upon hydroxylamine and in the presence of polymerization initiators such as peroxides and the persels, for example hydrogen peroxide, the persulphates, etc. and carrying out a complete neutralization of the polymer using sodium or potassium hydroxide. This polymer is then introduced in sufficient quantity to the aqueous suspension of mineral materials which is stirred in order to facilitate dispersion.

The applicant, in his research, wishing to bring about improved grinding of mineral materials in aqueous suspension, attempted to use such a polymer as a "grinding agent" by introducing it into the suspension of mineral substances containing at least 50% by weight of dry matter, a value which had earlier been regarded as a maximum not to be exceeded; the applicant then observed that the suspension prepared in this way and subjected to grinding became highly viscous, such that it became unable in these conditions to grind or even to satisfactorily disperse the mineral materials.

On the basis of this observation, the applicant carried out further investigations into the fundamental reasons for the increase in viscosity, during the grinding operation of the aqueous suspension of mineral materials with a high concentration of dry matter and observed that the increase in the viscosity of the suspension was conditioned by the average specific viscosity of the acrylic alkaline polymers and/or copolymers used as grinding agents having a mean specific viscosity less than 0.8. Subsequently, by carrying out a number of grinding operations on aqueous suspensions containing high concentrations of mineral materials, the applicant established that the only fraction of the acrylic alkaline polymers and/or copolymers possessing the maximum basic qualities of a grinding agent is that of which the specific viscosity lies between 0.3 and 0.8. Such a grinding agent described in French Pat. No. 2 488 814 represents substantial progress over earlier knowledge, since this fraction of acrylic alkaline polymers and/or copolymers permits the conversion by grinding in an aqueous suspension with a high concentration of dry matter of coarse mineral substances into very fine particles of which 95% have a dimension less than 2 microns and of which 75% at least have a dimension less than 1 micron, but also permits the realization of a suspension of very fine mineral substances of which the viscosity is much lower than that obtained by using additives recommended in the prior art.

However, it has been observed, in spite of the considerable improvements provided by this grinding agent, that the viscosity of suspensions of very fine mineral particles, resulting from grinding in the presence of this agent, was not absolutely stable with time, for example this viscosity after standing for 8 days possibly being 2 to 5 times higher than that measured on the same suspensions immediately after grinding.

Since the well-known methods did not satisfy the requirements of a pigmentary aqueous suspension simultaneously having a high concentration of dry matter, high fineness and low viscosity stable with time, the applicant continued his research and discovered and developed a grinding agent for mineral substances in an aqueous medium whereby it is possible to obtain a pigmentary suspension having the desired qualities without the above-mentioned drawbacks.

According to the invention, the grinding agent for an aqueous suspension of coarse mineral materials, intended for applications in pigments, consists of acrylic acid polymers and/or copolymers obtained according to the known processes of polymerization, and is characterised by the fact that it is partially neutralized by at least one neutralizing agent having at least one monovalent radical.

During the many grinding tests the applicant carried out in the presence of a grinding agent, it became clear that it was possible to make pigmentary aqueous suspensions simultaneously having a high concentration of dry matter, high fineness and low viscosity which was also stable with time. This stability being a substantial improvement over the results obtained using earlier methods, on the condition that the said grinding agent is formed by partially neutralized acrylic polymers and/or copolymers.

The acrylic polymers and/or copolymers intended to be used as a grinding agent according to the invention result from the polymerization of at least one of the following monomers or comonomers: acrylic and/or methacrylic acid, itaconic acid, crotonic acid, fumaric acid, maleic acid, isocrotonic acid, aconitic acid, mesaconic acid, sinapinic acid, undecylenic acid, angelic acid, hydroxyacrylic acid, acroleine, acrylamide, acrylonitrile, the esters of acrylic and methacrylic acids and in particular dimethylaminoethyl methacrylate, the imidazoles, vinylpyrolidone, vinylcaprolactame, ethylene, propylene, isobutylene, diisobutylene, vinyl acetate, syrene, alphamethylstyrene, methylvinylketone, polymerisation according to the known methods in an aqueous, alcoholic, hydroalcoholic, aromatic or aliphatic medium.

Thus, the polymerization medium may be water, methanol, ethanol, propanol, isopropanol, the butanols, or dimethylformamide, dimethylsulphoxide, tetrahydrofuran, acetone, methylethylketone, ethyl acetate, butyl acetate, hexane, heptane, benzene, toluene, xylene, mercaptoethanol, tertioduodecylmercaptan, thioglycolic acid and its esters, n-duodecylmercaptan, acetic acid, tartaric acid, lactic acid, citric acid, gluconic acid, glucoheptonic acid, 2-mercaptopropionic acid, thiodiethanol, halogenated solvents such as carbon tetrachloride, chloroform, methylene chloride, methyl chloride, the ethers of monopropyleneglycol and diethyleneglycol.

The acrylic polymers and/or copolymers intended for use as a grinding agent according to the invention generally have a specific viscosity equal to 25 at the most and, preferably, 10 at the most. As already mentioned, these polymers result from polymerization carried out according to known processes, in the presence of initiators and regulators well-known to the specialist.

Immediately upon completion of polymerization the solution of the polymer obtained is partially neutralized using an appropriate neutralizing agent.

The neutralizing agent has at least one monovalent function, i.e. it may have a monovalent function or a polyvalent function or simultaneously at least two monovalent functions and at least two polyvalent function.

In particular, the neutralizing agent may with advantage consist of a mixture of at least one neutralizing agent having at least one monovalent function with at least one neutralizing agent having a polyvalent function.

When the neutralizing agent has a monovalent function, it belongs to the group formed by the alkaline cations, in particular sodium and potassium, or ammonia, or the primary, secondary or tertiary aliphatic and/or cyclic amines such as for example the ethanolamines (mono, di, tri-ethanolamine), mono and diethylamine, cyclohexylamine and methylcyclohexylamine.

When the neutralizing agent has a polyvalent function, it belongs to the group formed by the alkaline earth cations in particular magnesium and calcium, or it may be zinc or aluminum.

The acrylic polymers and/or copolymers to be used as a grinding agent according to the invention generally have a specific viscosity of 25 at the most and preferably 10 at the most. As has already been said, these polymers are produced by polymerization according to known processes in the presence of initiators and regulators.

The specific viscosity of the acrylic polymers and/or copolymers which is symbolised by the letter "$\eta$" is determined as follows:

A solution of acrylic polymer and/or copolymer neutralized to 100% (neutralization rate: (1) by sodium hydroxide is prepared by dissolving 50 g of dry polymer and/or copolymer in 1 liter of a solution of distilled water containing 60 g of NaCl. Using a capillary viscometer with a Baume constant equal to 0.000105 in a bath thermostatically held at 25° C., the flow time are measured for a given volume of the above-mentioned solution containing the alkaline acrylic polymer and/or copolymer and the same volume of an solution of sodium chloride not containing the polymer and/or copolymer. It is then possible to define the viscosity "$\eta$" using the following relationship:

$$\eta = \frac{(\text{Flow time of polymer solution}) - (\text{Flow time of NaCl solution})}{\text{Flow time of the NaCl solution}}$$

The capillary tube is usually selected such that the flow time of the NaCl solution not containing polymer and/or copolymer is about 90–100 seconds, thus giving measurements of specific viscosity of very high precision.

The partial neutralization rate of the active sites of the polymer in solution leading to the grinding agent according to the invention, is 0.98 at the most, and usually lies between 0.40 and 0.96 and preferentially between 0.50 and 0.75.

It is clear and it has been verified by the applicant that the partial neutralization rate of the active sites may be obtained, by equivalence by mixing appropriate fractions of totally neutralized and completely acid polymers and/or copolymers.

According to a variant, the acrylic polymers and/or copolymers intended to be used as a grinding agent according to the invention may be formed by the single fraction of these partially neutralized polymers and/or copolymers of which the specific viscosity lies between 0.3 and 0.8.

In this case, the fraction of the acrylic polymer and/or copolymer with specific viscosity lying between 0.3 and 0.8 intended to be used as a grinding agent is usually isolated and extracted from the solution which results from polymerization of at least one of the above-mentioned monomers according to known methods. Immediately upon completion of polymerization which is carried out in the presence of initiators and regulators well known to the specialist, the solution of the polymer obtained is partially neutralized by at least one neutralizing agent having at least one monovalent function as has already been described.

The solution of the polymer neutralized in this way is then treated using the methods known to the specialist by a polar solvent belonging to the group formed by methanol, ethanol, propanol, isopropanol, acetone, tetrahydrofuran. A separation into two phases then occurs. The less dense phase, comprising the major fraction of the polar solvent and the undesirable fraction of acrylic polymer and/or copolymer is eliminated while the denser aqueous phase is collected and constitutes the fraction of the alkaline acrylic polymers and/or copolymers of which the specific viscosity lies between 0.3 and 0.8.

It is also possible and desirable in certain cases to refine further this collection of the fraction of alkaline acrylic polymers and/or copolymers by processing once more the denser aqueous phase previously collected using a new amount of polar solvent, which may be different from that originally used, or which may be a mixture of polar solvents. Two phases again appear of which the denser, the aqueous phase, is collected and constitutes a fraction of the partially neutralized acrylic polymers and/or copolymers of which the specific viscosity lies in a narrower range. In practice, it has proved useful to select the fraction of partially neutralized acrylic polymers and/or copolymers of which the specific viscosity lies between 0.50 and 0.70.

In practice, the liquid phase resulting from polymerization and containing the partially neutralized acrylic polymers and/or copolymers may be used in this form as a grinding agent for the mineral substances to be reduced but it can also be processed by any known methods in order to eliminate this phase and isolate the partially neutralized acrylic polymers and/or copolymers in the form of a fine powder which can be used as a grinding agent.

In the case of the variant, the temperature at which the process of selecting the fraction of partially neutralized acrylic polymer and/or copolymer is not critical in itself, since it influences only the partition coefficient. In practice this process of selection is carried out at ambient temperature but it is not excluded that it may be carried out at higher temperatures.

The specific viscosity of the acrylic polymers and/or copolymers, which is symbolised by the letter "$\eta$" is determined as follows:

A solution of acrylic polymer and/or copolymer is prepared, neutralized to 100% (neutralisation rate =1) using soda by dissolving 50 g of dry polymer and/or copolymer in 1 liter of a solution of distilled water containing 60 g of NaCl. Then, using a capillary viscometer with a Baume constant equal to 0.000105 in a bath, the temperature of which is controlled thermostatically at 25° C., the flow time of a given volume of the above-mentioned solution containing the alkaline acrylic polymer and/or copolymer is measured, together with the flow time of the same volume of aqueous solution of sodium chloride containing none of the polymer and/or copolymer. The viscosity "$\eta$" can be defined according to the following relationship:

$$\eta = \frac{\text{(flow time of the solution of polymer)} - \text{(flow time of the NaCl solution)}}{\text{(flow time of the NaCl solution)}}$$

The capillary tube is usually chosen such that the flow time of the NaCl solution containing no polymer and/or copolymer is about 90–100 seconds, thus giving measurements of specific viscosity of high precision.

The operation of grinding the mineral substance to be refined involves grinding the mineral substance with a grinding material into very fine particles in an aqueous medium containing the grinding agent.

In practice, an aqueous suspension of the mineral substance to be ground, having an initial size of 50 microns at the most, is formed such that the concentration of dry matter in the said suspension is at least 70% by weight.

To the suspension of the mineral substance is added the grinding material, the grain size of which lies with advantage between 0.20 mm and 4 mm. The grinding material is generally in the form of particles of materials as varied as silicon oxide, aluminum oxide, zirconium oxide or mixtures of these as well as hard synthetic resins, steels, etc.

An example of the composition of such grinding materials is given by French Pat. No. 2 203 681 which describes grinding materials formed from 30 to 70% by weight of zirconium oxide, 0.1 to 5% of aluminum oxide and 5 to 20% silicon oxide. The grinding material is preferably added to the suspension in an amount such that the weight ratio between this grinding material and the mineral substance to be ground is at least 2 to 1, this ratio being preferably between the limits 3 to 1 and 5 to 1.

The mixture of the suspension and the grinding material is then mechanically stirred in the same way as in a conventional microgrinder.

The grinding agent consisting of the partially neutralized acrylic polymer and/or copolymer is also introduced into the mixture formed by the aqueous suspension of mineral substances and the grinding material at 0.2 to 2% by weight of the dry fraction of the said polymers with respect to the mass of the mineral substance to be defined.

The time necessary to reach a high degree of fineness of the mineral substance after grinding varies according to the nature and quantity of the mineral substances to be reduced and according to the method of stirring used and the temperature of the medium during the grinding operation.

The mineral substances to be refined according to the process of the invention may be of varied origins such as calcium carbonate and the dolomites, calcium sulphate, kaolin, titanium dioxide, i.e. all the mineral substances which must be ground in order to be usable in applications as varied as paper coating pigmentation of paints, filler for rubbers or synthetic resins, matting synthetic textiles and so on.

Thus the application of the grinding agent according to the invention permits the conversion, by grinding in an aqueous suspension with a high concentration of dry matter, of coarse mineral substances into very fine particles of which 95% have one dimension always less than 2 microns and of which at least 75% have one dimension less than 1 micron and leads to a suspension of very fine mineral substances of which the viscosity is low and stable with time.

EXAMPLE 1

This example which is intended to illustrate the Prior Art concerns the grinding of calcium carbonate in the presence of a grinding agent which is a sodium polyacrylate obtained by polymerizing acrylic acid in the presence of initiators and regulators according to two methods known to the specialist.

A first test concerns the grinding of calcium carbonate in the presence of sodium polyacrylate obtained by the radical polymerization of acrylic acid in water, followed by complete neutralization using sodium hydroxide.

A second test concerns the grinding of calcium carbonate in the presence of sodium polyacrylate obtained by the radical polymerization of acrylic acid in an aqueous medium, in the presence of isopropanol, followed by a distillation of the alcohol and a complete neutralization of the polymer using sodium hydroxide.

These two tests were carried out according to the same experimental criteria, the grinding being carried out in the same equipment, in order that the results might be comparable.

For each test, an aqueous suspension of calcium carbonate obtained from the Orgon (France) deposit was prepared, having a grain size less than 43 microns.

The aqueous suspension had a concentration of dry matter of 76% by weight with respect to the total mass.

The grinding agent was introduced into this suspension in the quantities shown in the following table, expressed as a percentage of dry weight with respect to the mass of calcium carbonate to be ground.

The suspension circulated in a grinder of the dyno-mill type with a stationary cylinder and rotating impeller in which the grinding material consisted of corindon balls of diameter between 0.5 mm and 1.6 mm.

The total volume occupied by the grinding material was 1150 cubic centimetres and its mass was 3040 g.

The grinding chamber had a volume of 1400 cubic centimetres.

The circumferential velocity of the grinder was 10 m per second.

The suspension of calcium carbonate was recycled at the rate of 18 l per hour.

The outlet of the dyno-mill grinder was fitted with a separator with a 200 micron mesh for separating the suspension resulting from the grinding process and the grinding material.

The temperature during each grinding test was kept at 65° C.

The grinding time in the experimental conditions described above was between 60 and 100 minutes and was the time necessary to obtain a ground mineral substance in which at least 75% of the particles had one dimension less than 1 micron.

On completion of grinding, the viscosity of the pigmentary suspension was measured using a Brookfield viscometer, at a temperature of 20° C. and a speed of 100 rpm using spindle no. 3.

After standing for 24 hours and 8 days, the viscosity of the suspension was measured again after being briefly stirred.

All the experimental results are shown in Table 1.

TABLE 1

|  | TEST 1 | TEST 2 |
|---|---|---|
| mineral substance to be ground | $CaCO_3$ (urgonite) | $CaCO_3$ (urgonite) |
| Concentration of dry matter in the suspension subjected to grinding | 76% | 76% |
| Grinding agent | Sodium polyacrylate | Sodium polyacrylate |
| Neutralization rate | 1 (100%) | 1 (100%) |
| Polymerization medium | Water | Water and isopropanol |
| Specific viscosity of the grinding agent | 0.58 | 0.54 |
| Consumption of grinding agent in % dry weight | 1.33 | 1.04 |
| pH of grinding medium | 9.2 | 9.2 |
| % mineral sustances at 1 micron at end of grinding | 78 | 78 |
| Grinding temperature kept at: | 65° C. | 65° C. |
| Viscosity in cps at 20° C. | | |
| after grinding | 850 | 500 |
| after standing for 24 hours; stirred before measurement | 1280 | 800 |
| after standing for 8 days; stirred before measurement | 3600 | 1520 |

The table shows that the viscosity of the suspension immediately after grinding is high and that this viscosity is unstable with time whatever its initial value, since it rises substantially when the suspension has been allowed to stand.

EXAMPLE 2

This example, which is intended to illustrate the object of the invention concerns the grinding of the same calcium carbonate used in example 1, in the presence of a grinding agent which is a partially neutralized polyacrylic acid, obtained by the polymerization of acrylic acid according to the same processes as those used for tests 1 and 2 of example 1.

In a test no. 3, the calcium carbonate was ground in the presence of polyacrylic acid obtained as in test no. 1 of example 1, by the radical polymerization of acrylic acid in water and partial neutralization of the polymer at a rate of 0.66 by sodium hydroxide.

In a test no. 4, the calcium carbonate was ground in the presence of polyacrylic acid obtained according to the process of test no. 2 of example 1, by the radical polymerization of acrylic acid in an aqueous medium in the presence of isopropanol with partial neutralization of the polymer by sodium hydroxide at a rate of 0.66.

For each of the tests 3 and 4, an aqueous suspension of calcium carbonate obtained from the Orgon (France) deposit was prepared with a grain size less than 43 microns.

The aqueous suspension had a concentration of dry matter of 76% by weight with respect to the total mass.

The grinding agent was introduced into this suspension in the amounts shown in Table 2 below, expressed as a percentage by weight with respect to the mass of calcium carbonate to be ground.

The suspension to be ground was placed in the same grinder as in example 1, with the same amount of grinding material and was treated according to the same experimental criteria in order that the results obtained may be comparable with those of example 1.

All the experimental results are given in Table 2 below.

TABLE 2

|  | TEST 3 | TEST 4 |
|---|---|---|
| Mineral substance to be ground | $CaCO_3$ (urgonite) | $CaCO_3$ (urgonite) |
| Concentration of dry matter in the suspension subjected to grinding | 76% | 76% |
| Grinding agent | Polyacrylic acid | Polyacrylic acid |
| Neutralization rate | 0.66 | 0.66 |
| Polymerization medium | Water | Water and isopropanol |
| Specific viscosity of the grinding agent | 0.58 | 0.54 |
| Consumption of grinding agent in % dry weight | 1.54 | 1.25 |
| pH of grinding medium | 9.2 | 9.2 |
| % mineral substances at 1 micron at end of grinding | 78 | 79 |
| Grinding temperature kept at: | 65° C. | 65° C. |
| Viscosity in cps at 20° C. | | |
| after grinding | 460 | 330 |
| after standing for 24 hours; stirred before measurement | 450 | 300 |
| after standing for 8 days: stirred before measurement | 470 | 320 |

This second table shows, by comparison with the table of example 1, the extraordinary fall in the viscosity of the calcium carbonate suspension resulting from a grinding operation according to the invention, in other words carried out in the presence of a grinding agent consisting of the acrylic polymer partially neutralized by means of sodium hydroxide, i.e. by at least one neutralizing agent having at least one monovalent function.

This second table also shows the substantial improvement in the viscosity of the calcium carbonate suspension, thanks to the comparison of tests 1 and 3 and 2 and 4, immediately after grinding and also after standing for 24 hours and 8 days.

Thanks to the grinding agent according to the invention, the suspensions of calcium carbonate with a high concentration of dry matter acquire after grinding a very low viscosity which is stable with time.

EXAMPLE 3

This example which is intended to illustrate the object of the invention, concerns the grinding of the same calcium carbonate used in example 1, in the presence of a grinding agent which is a polyacrylic acid obtained by the polymerization of acrylic acid according to the process used for test 2 of example 1 with neutralization of the polymer by potassium hydroxide.

In test no. 5 which illustrates former practice, the calcium carbonate was ground in the presence of potassium polyacrylate obtained as in test no. 2 of example 1 by radical polymerization of acrylic acid in an aqueous medium, in the presence of isopropanol with complete neutralization of the polymer by potassium hydroxide.

In test no. 6 which illustrates the invention, the calcium carbonate was ground in the presence of polyacrylic acid obtained according to the process of test no. 2 of example 1, by radical polymerization of acrylic acid in an aqueous medium in the presence of isopropanol with partial neutralization of the polymer by potassium hydroxide at a rate of 0.66.

For each of the tests 5 and 6, an aqueous suspension of calcium carbonate obtained from the Orgon (France) deposit was prepared having a grain size less than 43 microns.

The aqueous suspension had a concentration of dry matter of 76% by weight with respect to the total mass.

The grinding agent was introduced into this suspension in the amounts shown in Table 3 below, expressed as a percentage by weight with respect to the mass of calcium carbonate to be ground.

The suspension to be ground was placed in the same grinder as example 1, with the same amount of grinding material and was processed according to the same experimental criteria in order that the results obtained might be compared with those of example 1.

TABLE 3

|  | TEST 5 | TEST 6 |
|---|---|---|
| Mineral substance to be ground | CaCO3 (urgonite) | CaCO3 (urgonite) |
| Concentration of dry matter in the suspension subjected to grinding | 76% | 76% |
| Grinding agent | Potassium polyacrylate | Polyacrylic acid |
| Neutralization rate | 1 | 0.66 |
| Polymerization medium | Water and isopropanol | Water and isopropanol |
| Specific viscosity of the grinding agent | 0.54 | 0.54 |
| Consumption of grinding agent in % dry weight | 1.15 | 1.38 |
| pH of grinding medium | 9.2 | 9.2 |
| % mineral sustances at 1 micron at end of grinding | 79 | 79 |
| Grinding temperature kept at: | 65° C. | 65° C. |
| Viscosity in cps at 20° C. | | |
| after grinding | 610 | 420 |
| after standing for 24 hours; stirred before measurement | 1260 | 400 |
| after standing for 8 days: stirred before measurement | 2100 | 500 |

Test 6 shows, by comparison with test 5 and the table of example 1, the extraordinary fall in the viscosity of the calcium carbonate suspension resulting from a grinding operation according to the invention, i.e. carried out in the presence of a grinding agent consisting of the acrylic polymer partially neutralized by KOH, and a reduction in the viscosity immediately after grinding as well as after standing for 24 hours and 8 days.

Thanks to the grinding agent according to the invention, the suspensions of calcium carbonate with a high concentration of dry matter acquire after grinding a viscosity which is very low and stable with time.

EXAMPLE 4

This example which is intended to illustrate the object of the invention concerns the grinding of the same calcium carbonate as used in example 1, in the presence of a grinding agent which is a polyacrylic acid obtained by the polymerisation of acrylic acid according to the same processes as those used for test 2 of example 1 with neutralization of the polymerization by ammonium hydroxide.

In test no. 7, the calcium carbonate was ground in the presence of ammonium polyacrylate obtained as in test no. 2 of example 1 by radical polymerization of acrylic acid in an aqueous medium in the presence of isopropanol with complete neutralization of the polymer by ammonium hydroxide.

In test no. 8, which illustrates the invention, the calcium carbonate was ground in the presence of polyacrylic acid obtained according to the process of test no. 2 of example 1, by radical polymerization of acrylic acid in an aqueous medium in the presence of isopropanol with partial neutralization of the polymer by ammonium hydroxide at a rate of 0.66.

For each of the tests 7 and 8 a suspension was prepared according to the amounts shown in Table 4 below, expressed as a percentage by weight with respect to the mass of calcium carbonate to be ground.

The suspension to be ground was placed in the same grinder as in example 1, with the same amount of grinding material and was processed according to the same experimental criteria in order that the results obtained might be compared with those of example 1.

All the experimental results are shown in Table 4 below.

TABLE 4

|  | TEST 7 | TEST 8 |
|---|---|---|
| Mineral substance to be ground | CaCO3 (urgonite) | CaCO3 (urgonite) |
| Concentration of dry matter in the suspension subjected to grinding | 76% | 76% |
| Grinding agent | Ammonium polyacrylate | Polyacrylic acid |
| Neutralization rate | 1 | 0.66 |
| Polymerization medium | Water and isopropanol | Water and isopropanol |

TABLE 4-continued

|  | TEST 7 | TEST 8 |
|---|---|---|
| Specific viscosity of the grinding agent | 0.54 | 0.54 |
| Consumption of grinding agent in % dry weight | 1.4 | 1.6 |
| pH of grinding medium | 9.2 | 9.2 |
| % mineral sustances at 1 micron at end of grinding | 78 | 78 |
| Grinding temperature kept at: | 65° C. | 65° C. |
| Viscosity in cps at 20° C. | | |
| after grinding | 650 | 540 |
| after standing for 24 hours; stirred before measurement | 1100 | 510 |
| after standing for 8 days: stirred before measurement | 1800 | 550 |

Test 8 shows, by comparison with test no. 7 and the table of example 1, the extraordinary fall in the viscosity of the calcium carbonate suspension resulting from a grinding operation according to the invention, i.e. carried out in the presence of a grinding agent consisting of the acrylic polymer partially neutralized by ammonium hydroxide, and a reduction of viscosity immediately after grinding as well as after standing for 24 hours and 8 days.

EXAMPLE 5

This example which is intended to illustrate the object of the invention concerns the grinding of the same calcium carbonate used in example 1, in the presence of a grinding agent which is a polyacrylic acid obtained by polymerization of acrylic acid according to the same processes as those used for test no. 2 of example 1 with neutralization by a mixture of at least one neutralizing agent having at least one monovalent function with at least one neutralisating agent having a polyvalent function.

In test no. 9, the calcium carbonate was ground in the presence of polyacrylic acid obtained as in test no. 2 of example 1, by radical polymerization of the acrylic acid in water in the presence of isopropanol with neutralization of the polymerisate by a mixture of hydroxides, at a rate of 0.46 for sodium hydroxide and 0.20 for calcium hydroxide.

In test no. 10, the calcium carbonate was ground in the presence of polyacrylic acid obtained according to the process of test no. 2 of example 1, by radical polymerization of acrylic acid in an aqueous medium in the presence of isopropanol with neutralization of the polymer by a mixture of hydroxides at the rate of 0.61 for potassium hydroxide and 0.05 for aluminium hydroxide. For each of the tests 9 and 10 an aqueous suspension of calcium carbonate from the Orgon (France) deposit was prepared having a grain size less than 43 microns.

The aqueous suspension had a concentration of dry matter of 76% by weight with respect to the total mass.

The grinding agent was introduced into this suspension in the amounts shown in Table 5 below, expressed as a percentage by weight with respect to the mass of calcium carbonate to be ground.

The suspension to be ground was placed in the same grinder as in example 1 with the same amount of grinding material and was processed according to the same experimental criteria, in order that the results obtained may be compared with those of example 1.

All the experimental results are given in Table 5 below.

TABLE 5

|  | TEST 9 | TEST 10 |
|---|---|---|
| Mineral substance to be ground | CaCO$_3$ (urgonite) | CaCO$_3$ (urgonite) |
| Concentration of dry matter in the suspension subjected to grinding | 76% | 76% |
| Grinding agent | Polyacrylic acid | Polyacrylic acid |
| Neutralization rate | 0.46 NaOH+ 0.20 CaO | 0.61 KOH+ 0.05 Al$_2$O$_3$ |
| Polymerization medium | Water and isopropanol | Water and isopropanol |
| Specific viscosity of the grinding agent | 0.54 | 0.54 |
| Consumption of grinding agent in % dry weight | 1.46 | 1.40 |
| pH of grinding medium | 9.2 | 9.2 |
| % mineral sustances at 1 micron at end of grinding | 79 | 79 |
| Grinding temperature kept at: | 65° C. | 65° C. |
| Viscosity in cps at 20° C. | | |
| after grinding | 300 | 450 |
| after standing for 24 hours; stirred before measurement | 280 | 440 |
| after standing for 8 days; stirred before measurement | 270 | 550 |

This fifth table shows, by comparison with the table of example 1, the considerable fall in the viscosity of the calcium carbonate suspension resulting from a grinding operation according to the invention, i.e. carried out in the presence of a grinding agent consisting of an acrylic polymer partially neutralized by means of a mixture of hydroxides, one having a monovalent function, the other a polyvalent function.

This fifth table also shows the substantial fall in the viscosity of the calcium carbonate suspension when tests 9 and 10 are compared with test 2 immediately after grinding as well as after standing for 24 hours and 8 days.

Thanks to the grinding agent according to the invention, the calcium carbonate suspensions with a high concentration of dry matter acquire after grinding a viscosity which is very low and stable with time.

EXAMPLE 6

This example which is intended to illustrate the variant of the invention, concerns the grinding of the same calcium carbonate used in example 1 in the presence of a grinding agent which is a polyacrylic acid obtained according to the same method of polymerization as in test no. 2 followed by partial neutralisation by sodium hydroxide at a rate of 0.66 and extraction using a polar solvent (isopropanol) of the fraction of the acrylic polymer having a specific viscosity lying between 0.3 and 0.8.

According to test no. 11, the aqueous solution of polymer being partially neutralized at the rate of 0.66, a weight representing 120 g of dry polymer in 1046 g of water was taken, and shaken with 282 g of isopropanol. After separation into two phases by settling, the less dense phase, comprising the major part of the polar solvent and the undesirable fractions of acrylic polymer was eliminated, while the denser aqueous phase was collected and constituted the fraction of acrylic polymer having the fundamental qualities of a grinding agent, of which the specific viscosity was 0.51.

For this test no. 11, an aqueous suspension of calcium carbonate obtained from the Orgon (France) deposit was prepared having a grain size less than 43 microns.

The aqueous suspension had a concentration of dry matter of 76% by weight with respect to the total mass.

The grinding agent was introduced into this suspension in the amounts shown in Table 6 below, expressed as a percentage by weight with respect to the mass of calcium carbonate to be ground.

The suspension to be ground was placed in the same grinder as in example 1, with the same amount of grinding material and was processed according to the same experimental criteria in order that the results obtained might be compared with those of example 1.

All the experimental results are given in Table 6 below.

TABLE 6

|  | TEST 11 |
|---|---|
| Mineral substance to be ground | CaCO₃ (urgonite) |
| Concentration of dry matter in the suspension subjected to grinding | 76% |
| Grinding agent | Polyacrylic acid |
| Neutralization rate | 0.66 |
| Polymerization medium | Water and Isopropanol |
| Specific viscosity of the grinding agent | 0.51 |
| Consumption of grinding agent in % dry weight | 1.4 |
| pH of grinding medium | 9.2 |
| % mineral substances at 1 micron at end of grinding | 78 |
| Grinding temperature kept at: | 65° C. |
| Viscosity in cps at 20° C. | |
| after grinding | 420 |
| after standing for 24 hours; stirred before measurement | 425 |
| after standing for 8 days; stirred before measurement | 400 |

That table shows, by comparison with the table of example 1, the considerable fall in the viscosity of the calcium carbonate suspension resulting from the grinding operation according to the invention, i.e. carried out in the presence of a grinding agent consisting of the fraction of the acrylic acid polymer, partially neutralized, isolated by means of a polar solvent, with specific viscosity after extraction lying between 0.3 and 0.8.

This table also shows the outstanding improvement of the viscosity of the calcium carbonate suspension in a comparison with tests 1 and 2 both immediately after grinding and after standing for 24 hours and 8 days.

Thanks to the grinding agent according to the invention, the calcium carbonate suspensions with a high concentration of dry matter acquire after grinding a viscosity which is very low and truly stable with time.

EXAMPLE 7

This example which is intended to illustrate the object of the invention, concerns the grinding of the same calcium carbonate used in example 1, in the presence of a grinding agent which is an acrylic acid/butyl acrylic copolymer in the ratio 70/30 obtained by polymerization in isopropanol, followed by a partial neutralization by potassium hydroxide at a rate of 0.9. The isopropanol is finally eliminated by distillation and replaced by water.

For test 12, an aqueous suspension of calcium carbonate obtained from the Orgon (France) deposit was prepared having a grain size less than 43 microns.

The aqueous suspension had a concentration of dry matter of 76% by weight with respect to the total mass.

The grinding agent was introduced into this suspension in the amounts shown in Table 7 below, expressed as a percentage by weight with respect to the mass of calcium carbonate to be ground.

The suspension to be ground was placed in the same grinder as in example 1, with the same amount of grinding material, and was processed according to the same experimental criteria, in order that the results obtained might be compared with those of example 1.

All the experimental results are shown in Table 7 below.

TABLE 7

|  | TEST 12 |
|---|---|
| Mineral substance to be ground | CaCO₃ (urgonite) |
| Concentration of dry matter in the suspension subjected to grinding | 76% |
| Grinding agent | AA/ABu copolymer |
| Neutralization rate | 0.9 |
| Polymerization medium | Isopropanol |
| Specific viscosity of the grinding agent | 0.525 |
| Consumption of grinding agent in % dry weight | 1.17 |
| pH of grinding medium | 9.2 |
| % mineral sustances at 1 micron at end of grinding | 60 |
| Grinding temperature kept at: | 65° C. |
| Viscosity in cps at 20° C. | |
| after grinding | 650 |
| after standing for 24 hours; stirred before measurement | 720 |
| after standing for 8 days; stirred before measurement | 950 |

This table shows, by comparison with the table of example 1, the reduction in the viscosity of the calcium carbonate suspension resulting from a grinding operation according to the invention, i.e. carried out in the presence of a grinding agent consisting of an acrylic acid-butyl acylate copolymer partially neutralised by a single radical agent in the ratio 0.9.

EXAMPLE 8

This example which is intended to illustrate the object of the invention concerns the grinding of the same calcium carbonate used in example 1, in the presence of a grinding agent which is a partially neutralized sodium polyacrylate obtained by polymerization of acrylic acid according to the same processes as those used for test 2 of example 1.

In test no. 13, the calcium carbonate was ground in the presence of polyacrylic acid obtained according to the process of test no. 2 of example, by radical polymerization of acrylic acid in an aqueous medium in the presence of isopropanol and partial neutralization of the polymer by sodium hydroxide at a rate of 0.5.

In test no. 14, the calcium carbonate was ground in the presence of polyacrylic acid obtained according to the process of test no. 2 of example 1, by radical polymerisation of acrylic acid in an aqueous medium in the presence of isopropanol and partial neutralization of the polymer by sodium hydroxide with a neutralization rate of 0.8.

For each of the tests 13 and 14, an aqueous suspension of calcium carbonate from the Orgon (France) deposit having a grain size less than 43 microns was prepared.

The aqueous suspension had a concentration of dry matter of 76% by weight with respect to the total mass.

The grinding agent was introduced into this suspension in the amounts shown in Table 8 below, expressed as a percentage by weight with respect to the mass of calcium carbonate to be ground.

The suspension to be ground was placed in the same grinder as in example 1, with the same amount of grinding material and was processed according to the same experimental criteria, in order that the results obtained might be compared with those of example 1.

TABLE 8

| | TEST 13 | TEST 14 |
|---|---|---|
| Mineral substance to be ground | $CaCO_3$ (urgonite) | $CaCO_3$ (urgonite) |
| Concentration of dry matter in the suspension subjected to grinding | 76% | 76% |
| Grinding agent | Polyacrylic acid | Polyacrylic acid |
| Neutralization rate | 0.5 of soda | 0.8 of soda |
| Polymerization medium | Water and isopropanol | Water and isopropanol |
| Specific viscosity of the grinding agent | 0.54 | 0.54 |
| Consumption of grinding agent in % dry weight | 1.8 | 1.25 |
| pH of grinding medium | 9.2 | 9.2 |
| % mineral sustances at 1 micron at end of grinding | 78 | 79 |
| Grinding temperature kept at: | 65° C. | 65° C. |
| Viscosity in cps at 20° C. | | |
| after grinding | 400 | 550 |
| after standing for 24 hours; stirred before measurement | 430 | 630 |
| after standing for 8 days; stirred before measurement | 410 | 730 |

This eighth table shows, by comparison with the table of example 1, the fall in the viscosity of the calcium carbonate suspension resulting from a grinding operation according to the invention, i.e. carried out in the presence of a grinding agent consisting of an acrylic acid polymer partially neutralized by sodium hydroxide at rates of 0.4 for test 13 and 0.8 for test 14.

We claim:

1. A process for the preparation of a stable aqueous mineral suspension, comprising the steps of:
   (i) combining (a) water, (b) $CaCO_3$, (c) a grinding agent which is at least one member selected from the group consisting of acrylic acid homopolymers and copolymers which are predominantly acrylic acid and contain at least one monomer selected from the group consisting of methacrylic acid, itaconic acid, crotonic acid, fumaric acid, maleic acid, isocrotonic acid, aconitic acid, mesaconic acid, sinapinic acid, undecylenic acid, angelic acid, hydroxyacrylic acid, acrolein, acrylamide, acrylonitrile, esters of acrylic acid, esters of methacrylic acid, dimethylaminoethyl methacrylate, imidazoles, vinylpyrrolidone, vinylcaprolactam, ethylene, propylene, isobutylene, diisobutylene, vinyl acetate, styrene, alphamethylstyrene and methylvinylketone, wherein from 40 to 80% of the acid groups of said homopolymers and copolymers have been neutralized with neutralizing agents, at least one of which is characterized by a monovalent function, and (d) a grinding material to give a mixture; and
   (ii) grinding said mixture to give said stable aqueous mineral suspension such that 95% of the particles are smaller than 2 microns and 75% of the particles are smaller than 1 micron.

2. The process of claim 1, wherein said grinding agent is an acrylic acid homopolymer.

3. The process of claim 1, wherein said grinding agent has a specific viscosity of from 0.3 to 0.8.

4. The process of claim 1, wherein said aqueous suspension contains at least 70% by weight of said $CaCO_3$.

5. The process of claim 1, wherein said grinding agent is introduced in an amount of 0.2 to 2% by weight, based on the dry weight of said $CaCO_3$.

6. The process of claim 1, wherein said grinding material is a granular particle having a grain size of 0.2 to 4 mm.

7. The process of claim 1, wherein said grinding material is one member selected from the group consisting of silicon oxide, aluminum oxide, zirconium oxide, steel, hard synthetic resins and mixtures thereof.

8. The process of claim 1, wherein said grinding material is added in an amount such that the weight ratio of said grinding material to said $CaCO_3$ is at least 2 to 1.

9. The process of claim 1, wherein from 50 to 75% of said acid groups of said homopolymers and said copolymers have been neutralized.

10. The process of claim 1, wherein said neutralizing agent is selected from the group consisting of alkali metal cations, ammonium cations, aliphatic amines and cyclic amines.

11. The process of claim 1, wherein said neutralizing agent has a polyvalent function.

12. The process of claim 11, wherein said neutralizing agent is selected from the group consisting of alkaline earth salt, zinc cations and aluminum cations.

13. The process of claim 1, wherein said monomer is selected from the group consisting of methacrylic acid, itaconic acid, crotonic acid, fumaric acid, and maleic acid.

14. An aqueous mineral suspension prepared by a method comprising the steps of:
   (i) combining (a) water, (b) $CaCO_3$, (c) a grinding agent which is at least one member selected from the group consisting of acrylic acid homopolymers and copolymers which are predominantly acrylic acid and contain at least one monomer selected from the group consisting of methacrylic acid, itaconic acid, crotonic acid, fumaric acid, maleic acid, isocrotonic acid, aconitic acid, mesaconic acid, sinapinic acid, undecylenic acid, angelic acid, hydroxyacrylic acid, acrolein, acrylamide, acrylonitrile, esters of acrylic acid, esters of methacrylic acid, dimethylaminoethyl methacrylate, imidazoles, vinylpyrrolidone, vinylcaprolactam, ethylene, propylene, isobutylene, diisobutylene, vinyl acetate, styrene, alphamethylstyrene and methylvinylketone, wherein from 40 to 80% of the acid groups of said homopolymers and copolymers have been neutralized with neutralizing agents, at least one of which is characterized by a monovalent function, and (d) a grinding material to give a mixture; and (ii) grinding said mixture to give said stable aqueous mineral suspension such that 95% of the particles are smaller than 2 microns and 75% of the particles are smaller than 1 micron.

15. The aqueous mineral suspension of claim 14, wherein the concentration of said $CaCO_3$ is at least 70% by weight of the total weight of said suspension.

* * * * *